(12) United States Patent
Gietema et al.

(10) Patent No.: US 12,067,796 B2
(45) Date of Patent: Aug. 20, 2024

(54) METHOD FOR DETECTING FRAUD IN DOCUMENTS

(71) Applicant: Onfido Ltd., London (GB)

(72) Inventors: Jochem Gietema, London (GB); Mohan Mahadevan, London (GB); Roberto Annunziata, London (GB); Pieter-jan Reynaert, London (GB); Elizaveta Ivanova, London (GB); Yuanwei Li, London (GB); Tal Shaharabany, London (GB); Shachar Ben Dayan, London (GB); Erez Farhan, London (GB); Francesco Picciotti, London (GB)

(73) Assignee: Onfido Ltd., London (GB)

( * ) Notice: Subject to any disclaimer, the term of this patent is extended or adjusted under 35 U.S.C. 154(b) by 311 days.

(21) Appl. No.: 17/719,199

(22) Filed: Apr. 12, 2022

(65) Prior Publication Data

US 2022/0351532 A1    Nov. 3, 2022

(51) Int. Cl.
*G06V 30/41* (2022.01)
*G06V 30/19* (2022.01)

(52) U.S. Cl.
CPC ........ *G06V 30/41* (2022.01); *G06V 30/19013* (2022.01); *G06V 30/19173* (2022.01)

(58) Field of Classification Search
CPC ............. G06V 30/41; G06V 30/19013; G06V 30/19173; G06V 10/454; G06V 40/40;
(Continued)

(56) References Cited

U.S. PATENT DOCUMENTS

| 7,590,344 B2 | 9/2009 | Petschnigg |
| 7,672,475 B2 | 3/2010 | O'Doherty et al. |

(Continued)

FOREIGN PATENT DOCUMENTS

| DE | 102018102015 A1 | 8/2019 |
| FR | 2977349 A3 | 1/2013 |
| WO | 2021044082 A1 | 3/2021 |

*Primary Examiner* — Akwasi M Sarpong
*Assistant Examiner* — Michael L Burleson
(74) *Attorney, Agent, or Firm* — Cesari & McKenna, LLP

(57) ABSTRACT

Described are methods and systems for detecting fraud in documents. First images of a first set of genuine documents and second images of a second set of genuine documents are obtained. A printed feature, spacings between printed features in the first images, and positions of printed features in the second images are selected. Selected features, spacings and positions are annotated to obtain original landmark locations for each printed feature, spacing and position. Annotated features, spacings and positions are transformed to obtain transformed features, transformed spacings and transformed positions. The transformed features, spacings and positions are combined with a noise model to generate modified features, modified spacings and modified positions. Each modified feature, modified spacing and modified position comprises annotations indicating modified landmark locations. Input data for a machine learning model is generated using original landmark locations and modified landmark locations. The machine learning model is trained using the input data.

29 Claims, 9 Drawing Sheets

(58) Field of Classification Search
CPC .. G06V 20/95; G06F 18/214; G06F 18/24133
See application file for complete search history.

(56) References Cited

U.S. PATENT DOCUMENTS

| | | | |
|---|---|---|---|
| 8,025,239 B2 | 9/2011 | Abrec et al. |
| 8,786,767 B2 | 7/2014 | Rihn et al. |
| 9,058,535 B2 | 6/2015 | Guigan |
| 9,081,988 B2 | 7/2015 | Dolev |
| 9,153,005 B2 | 10/2015 | Tremolada et al. |
| 9,418,282 B2 | 8/2016 | Rutz et al. |
| 10,019,626 B2 | 7/2018 | Schilling et al. |
| 10,019,627 B2 | 7/2018 | Kutter et al. |
| 10,127,454 B2 | 11/2018 | Pau et al. |
| 10,354,142 B2 | 7/2019 | Arlazarov et al. |
| 10,402,448 B2 | 9/2019 | Filgueiras de Araujo et al. |
| 10,477,087 B2 | 11/2019 | Rivard et al. |
| 10,621,426 B2 | 4/2020 | Gaubatz et al. |
| 10,789,463 B2 | 9/2020 | Kutter et al. |
| 10,872,488 B2 | 12/2020 | Azanza Ladron et al. |
| 2007/0041628 A1 | 2/2007 | Fan |
| 2008/0158258 A1 | 7/2008 | Lazarus et al. |
| 2014/0037196 A1 | 2/2014 | Blair |
| 2014/0055824 A1 | 2/2014 | Tremolada et al. |
| 2017/0132465 A1 | 5/2017 | Kutter et al. |
| 2019/0213408 A1 | 7/2019 | Cali et al. |
| 2019/0220660 A1 | 7/2019 | Cali et al. |
| 2019/0392196 A1 | 12/2019 | Sagonas et al. |
| 2020/0226405 A1* | 7/2020 | Huber, Jr ............ G06F 18/24 |
| 2021/0158036 A1* | 5/2021 | Huber, Jr. ........... G06V 30/413 |
| 2021/0160687 A1 | 5/2021 | Ross et al. |
| 2021/0200855 A1 | 7/2021 | Guigan |
| 2022/0398859 A1* | 12/2022 | Botros ............... G06V 10/7715 |

* cited by examiner

METHOD FOR DETECTING FRAUD IN DOCUMENTS

RELATED APPLICATIONS

This application claims priority to European Patent Application No. EP21170789.8, filed on Apr. 27, 2021, which is incorporated herein by reference in its entirety.

TECHNICAL FIELD

The subject matter of the application relates generally to a method for detecting fraud in a document. In particular, the subject matter relates to the use of metrology for detecting fraud in a document.

BACKGROUND

Government issued documents are usually designed and printed in such a way that is intended to be repeatable and precise. The repeatability and precision applies to every pixel in the document as well as to the structures in the documents, such as individual fields, individual characters, security elements, and picture location. This means that any element in a document that is either in the wrong location or printed differently in terms of attributes such as size, orientation and aspect ratio, has the potential to be detected through careful intra-structure and inter-structure measurements. That is, government issued documents are printed with a high level of precision and when fraudsters attempt to tamper with the documents, they leave "signals" behind as they are unable to reproduce this precision, which is present in the original printing process.

Here, precision refers to the geometric location, size and spatial orientation of every significant 'structure' in a given document. When the geometric location, size and spatial orientation attributes are measured for every significant 'structure' on the document, these measures can act as sensitive detectors of "fraud signals" left behind by fraudsters.

There are, however, several challenges in using machine learning to detect fraud using such fraud signals. One challenge is the presence of noise sources, both intrinsic and extrinsic noise. The presence of noise may unduly reject a genuine document as fraud, which adversely affects the reliability of a fraud detection system or unduly cause a fraudulent document to be accepted as a genuine one. Another challenge arises from the lack of statistically relevant volumes of data. For example, in some cases only a single sample of a document, say a Ugandan passport, may be available. This lack of statistically relevant volumes of data, for example, data pertaining to structures such as individual fields and characters for a particular document type, makes it difficult to account for real world variations across genuine copies of a particular document, which, in turn, reduces the ability of a fraud detection system that involves training a machine learning model to reliably detect fraud. There is therefore a need for a new approach that can reliably detect fraud in documents even when there are a limited number of genuine documents of a particular type available.

SUMMARY

The present disclosure addresses the above-identified problems and provides a method for training a machine learning model such that the trained machine learning model can be used for reliably detecting fraudulent documents even when there is only a limited amount of data available, while reducing the likelihood of false rejection of a genuine document. Training a machine learning model using "original reference landmark locations" on printed features, spacings and positions of printed features in digital images of genuine documents and "synthesizing" more "genuine" landmark locations using registration and noise model in the manner of the present disclosure ensures that the machine learning model is trained using a large dataset even when only a limited number of genuine documents are available. It also ensures that the machine learning model is trained with "noisy" data in order to address the problem of limited training data while accounting for noise due to possible variations across images of genuine documents. When a document is inputted to the trained machine learning model, the model annotates the document such that fraudulent documents can be identified by comparing these annotations with the respective reference landmark locations.

The invention, in one aspect, features a computer implemented method for training a machine learning model for detecting fraud in a document of a class of documents—for example, British passports, American driver's licenses, French identity cards, etc. The first stage of training the machine learning model is annotating a plurality of printed features and/or a plurality of spacings between the plurality of printed features in digital images of a first set of genuine documents of one or more classes of documents and/or a plurality of positions of a plurality of printed features in digital images of a second set of genuine documents to obtain "original reference landmark locations" for these printed features, spacings and positions. The first set of genuine documents may be selected from one or more classes of documents, for example, passports, driving licenses, ID cards, etc., whereas the second set of genuine documents belong to the same class of documents to which the document that is being authenticated belongs. For example, digital images of a set of genuine UK passports are used for obtaining annotated positions of printed features if the machine learning model is being trained to detect fraud in UK passports. That is, while the training of the machine learning model by annotating positions of printed features in genuine documents involves annotating positions in genuine documents which belong to the same class as the document that is being authenticated, the training of the machine learning model by annotating printed features and spacings are document agnostic.

The printed features can be alphanumeric characters, holograms, watermark, flags, a particular field in a document such as a name or an address field or a signature strip, or any other features that are printed on official documents such as driving licenses and passports. In essence, using the methods of the present disclosure, any printed feature, its position in a document, and its spacing relative to other printed features can be annotated. These annotations are then used to detect fraud according to embodiments of the present disclosure. It is noted that by annotating a printed feature, its position and its spacing relative to other printed features, it is also possible to detect anomalies in the orientation of the feature since the feature, position and spacing annotations would fall outside the boundaries of their expected locations when the feature is oriented in a different way to the orientation of a genuine feature.

The next stage in training the machine learning model is transforming the annotated printed features, spacings and/or positions against a plurality of other instances of the respective annotated printed feature, annotated spacing and/or annotated position. This transformation is referred to as "registration" in the art, which is a process of transforming different printed features, spacings and/or positions into the same coordinate system. Registration is performed on two sets of points between a set of reference points and a set of target points so as to bring them into alignment through homographic transformation. The spatial relationships between the transformed printed features, spacings, and/or positions can, for example, be translations, rotations, shears or complex deformations. For example, registering a letter "A" against other instances of the letter "A" may involve rotating, translating or shearing the letter. In this way, a plurality of annotated transformed printed features, a plurality of annotated transformed spacings and/or a plurality of annotated transformed positions are obtained for each of the plurality of printed features, spacings and/or positions in the digital images of the first set of genuine documents.

The annotated transformed printed features, spacings, and/or positions that are obtained following registration are, in turn, combined with a noise model to generate a plurality of modified printed features, modified spacings and/or modified positions for each respective annotated transformed printed feature, spacing, and/or position. In this way, for each printed feature, spacing and/or position in the digital images of the first set of documents, the method provides a plurality of respective modified printed features, spacings and/or positions.

Each modified printed feature, spacing and/or position comprises a plurality of annotations and these indicate "modified reference landmark locations" for the respective modified printed feature, spacing and/or position. These modified reference landmark locations together with the original reference landmark locations are used to generate input for the machine learning model, and the machine learning model is trained using this input data.

In some embodiments, training the machine learning model is based on a neural network model adapted for key point detection. In some embodiments, the machine learning model is a neural network model adapted for key point detection. In some embodiments, the training of the machine learning model is supervised training.

An advantage of training a machine learning model using reference landmark locations in the manner of the present disclosure is that as well as being trained on the original reference landmark locations on printed features, spacings and positions that are inputted to the model, the machine learning model is also trained on landmark locations on a respective group of "modified" (but still genuine) printed features, spacings and positions. In this way the machine learning model is trained on a number of "genuine" printed features, spacings and positions with their respective reference landmark locations even when there are only a limited number of actual genuine documents available. As a result, even when there are only a limited number of genuine copies of a class of documents available, the machine learning model is able to "synthesize" more genuine copies.

The first step in the disclosed method is obtaining digital images of the first and second sets of genuine documents. The first set of genuine documents may comprise one or more documents which may or may not be of the class of documents to which the document to be authenticated belongs, whereas the second set of genuine documents are of the same class to which the document to be authenticated belongs. For example, if the document to be authenticated is a UK passport, then the document(s) in the first set of genuine documents can be various genuine passports, driving licenses, or UK passports, whereas the second set of document(s) are all genuine UK passports. The digital images of the first and second sets of genuine documents are denoted the first and second digital images, respectively and each second digital image is an image of a region of the respective document in the second set of genuine documents, where a region can comprise a portion of or the whole respective document. The second set of genuine documents can be the same as, different from, or a subset of the first set of genuine documents.

The next step in the disclosed method is selecting at least one of a plurality of printed features, plurality of spacings between the plurality of printed features in the first digital images and plurality of positions of a plurality of printed features in the second digital images. In some embodiments, this selection is done by a human and only sharp images are selected at this stage. As an aid to human judgment, reference blur images and reference clear images may be provided for comparison with the images being selected. In some embodiments, this selection may be done automatically by computing a blur score for each first and second digital image to select images with the lowest blur.

Once the printed features, spacings and positions are selected, they are annotated, and these annotations are referred to as the "original reference landmark locations" in the respective annotated printed features, annotated spacings and annotated positions. For example, the letter "A" may be annotated in eleven places and thus has eleven reference landmark locations on the letter.

In some embodiments, this step of annotation of first digital images is done by a human. In some embodiments, the printed features in the first digital images are alphanumeric features. In some embodiments, annotating a plurality of printed features in the first digital images comprises annotating one or more of fonts for each printed feature in the plurality of printed features. For example, if there are several fonts for the letter "A" in a first digital image, then one or more fonts are annotated separately. In some embodiments, the printed features can be lower case or upper case.

In some embodiments, annotating a printed feature in the plurality of printed features in the first digital images comprises annotating a plurality of locations on the printed feature such that a shape of the printed feature can be represented as the annotated plurality of locations. In some embodiments, the original reference landmark locations are obtained for one or more fonts for each printed feature in the plurality of printed features. For example, if there are twenty-one fonts for the letter "A" and each font has eleven landmark locations associated with it, then there are eleven original reference landmark locations for one or more of the twenty-one fonts.

In some embodiments, annotating a plurality of spacings between the plurality of printed features in the first digital images comprises, for each spacing between two adjacent printed features in the plurality of spacings between the plurality of printed features, annotating a horizontal start of the spacing, annotating a vertical start of that spacing, annotating a horizontal end of the spacing, and annotating a vertical end of the spacing. In some embodiments, annotating a plurality of spacings between the plurality of printed features in the first digital images comprises, for each spacing between two adjacent printed features in the plurality of printed features, annotating centers of mass of the two adjacent printed features.

In some embodiments, annotating a plurality of positions of the plurality of printed features in the second digital images comprises, for each printed feature in the plurality of printed features in the second digital images, annotating a horizontal start of the printed feature, a vertical start of the printed feature, a horizontal end of the printed feature, and a vertical end of the printed feature.

In some embodiments, combining the plurality of annotated transformed printed features, plurality of annotated transformed spacings and/or plurality of annotated transformed positions with a noise model comprises imitating at least one of geometric transformations and radiometric transformations of the respective annotated transformed printed features, annotated transformed spacings and/or annotated transformed positions. In some embodiments, geometric transformations may include imitating perspective transformations or image distortions. In some embodiments, radiometric transformations may include imitating reflected or emitted radiation measured by a sensor during image capture.

In some embodiments, the noise model may be determined based on noise in digital images of another set of genuine documents, denoted the third set of genuine documents. The noise model may include noise that is inherent in a document arising from, for example, the document's background or the use of different printing techniques, which can cause the structures—for example, positions of features, spaces between the features, etc.—to appear variable from one document to another. The noise model may also include noise that arises in the image acquisition process, which may for example, cause blur or other optical aberrations. The first and second sets of genuine documents and the third set of genuine documents can be the same or different. For example, the first and second sets can be subsets of the third set of documents. Moreover, the third set of documents can belong to one or more class of documents. That is, the noise model may be determined using digital images of documents which may be in the same class as the document to be authenticated or may be in a different class, i.e. the noise model is document agnostic. For example, if the document to be authenticated is a UK passport, the documents in the third set of genuine documents from which the noise model is determined, may be French passports, California driver's licenses, or Spanish ID cards, as well as UK passports.

In some embodiments, the noise model may be determined separately for printed features, spacings between printed features and positions of printed features. In some embodiments, the noise model for printed features is determined based on noise in a plurality of printed features in the third digital images, the noise model for spacings between printed features is determined based on noise in a plurality of spacings between the plurality of printed features in the third digital images, and the noise model for positions of printed features is determined based on noise in a plurality of positions of the plurality of printed features in the third digital images.

In some embodiments, the noise model for printed features may be determined as follows. To start with, image quality, including blur, glare, contrast, occlusion and/or resolution, of the plurality of printed features in each third digital image is measured to obtain image quality metrics for the plurality of printed features in that third digital image. The image quality metrics are then calibrated. Based on the calibrated image quality metrics, a signal to noise ratio for the plurality of printed features in each third digital image is determined. The next step is determining a variance of the signal to noise ratio in the third digital images so as to model the signal to noise distribution. The noise model for printed features may then be the distribution of the signal to noise ratio.

In some embodiments, the noise model for spacings between printed features may be determined as follows. To begin with, a bounding box is defined for each printed feature in the plurality of printed features in the third digital images. Then one or more other bounding boxes are defined around one or more printed features that are adjacent to the respective printed feature. Distance(s) between the bounding box around the respective printed feature and the bounding box(es) around its adjacent printed feature(s) is/are calculated to obtain spacing(s) between the respective printed feature and its adjacent printed feature(s). The spacing(s) is/are then calibrated to obtain calibrated spacing measurement(s). The next step is determining the variance of the calibrated spacing measurements for the plurality of printed features in the third digital images. The noise model for spacings between printed features is then determined based on the calibrated spacing measurements.

In some embodiments, determining the noise model for positions of printed features may be determined as follows. To begin with, a bounding box with bounding box coordinates is defined around the respective printed feature for each printed feature in the plurality of printed features in each third digital image. In some embodiments, the bounding box coordinates are then mapped to a reference coordinate space to obtain mapped bounding box coordinates for the respective printed feature. Next, the variance of the bounding box coordinates or the mapped bounding box coordinates for the plurality of printed features in the third digital images is determined. Finally, the noise model for positions of printed features is determined based on the variance of the bounding box coordinates or the variance of the mapped bounding box coordinates.

An advantage of training the machine learning model using a noise model that is based on noise in images of genuine documents, in the manner of the present disclosure, is that the machine learning model is trained to account for different types of noise and their different impacts on printed features, spacings and positions in images of a document, thus reducing the likelihood of false rejections of genuine documents when the trained machine learning model is used to detect fraud in noisy images of documents.

In some embodiments, noise in the third digital images can be intrinsic noise. Intrinsic noise, can, for example, be caused by printing one or more of the plurality of printed features in the third set of genuine documents using optically variable ink or be caused by the variability in the manufacture and printing of documents. Noise can also be extrinsic noise, which arises in the image acquisition process. For example, extrinsic noise can be sensor noise, variable light levels, shadows and angles of lighting, out of focus aberrations, motion blur, flash, glare, optical aberrations across devices, aliasing noise and/or image angle, perspective, rotation, translation and occlusion. Image angle, perspective, rotation and translation may be results of document capturing conditions (e.g. position of a camera with respect to the document plane) or inaccuracy of the region extraction procedure. Of course, noise can also be a convolution of intrinsic and extrinsic noise.

Noise can also arise from the physical condition of a document. Examples of physical conditions that cause noise are smudge, physical damage to the document, and/or use of sleeve or plastic covers on documents. Noise can also arise from scalability, which is a scaling of fonts in digital images.

The invention, in another aspect, features a computer implemented method for detecting fraud in a document of a class of documents using the trained machine learning. The first step in the method is providing a digital image of the document to be authenticated. This digital image is an image of the same region for which the second digital images of the second set of genuine documents were obtained. Input data corresponding to the document for the trained machine learning model is generated using at least one of a plurality of printed features, a plurality of spacings between the plurality of printed features, and a plurality of positions of the plurality of printed features in this digital image. Once these are inputted to the trained machine learning model, the output of the model is a plurality of annotations on printed features, spacings between the printed features, and/or positions of printed features on the digital image. These annotations indicate respective landmark locations on the respective annotated printed feature, spacing and/or position.

In some embodiments, obtaining a plurality of annotations on printed features, spacings and/or positions at the output of the trained machine learning model comprises generating a respective distance map for each printed feature, spacing and/or position in the plurality of printed features, spacings and/or positions in the digital image of the document, where each pixel in each respective distance map represents a distance to the respective modified reference landmark locations for the respective printed feature, the respective spacing and the respective position. Then starting from a random location in the printed feature, spacing and/or position, the location of the random location is iteratively updated according to the respective distance map for the respective printed feature, the respective spacing and/or the respective position to obtain an updated location. At every iteration, the distance from the updated location to the respective modified reference landmark location for the respective modified printed feature, the respective modified spacing and/or the respective modified position is measured. The printed feature, spacing and/or position in the digital image is annotated at a location when the distance from the updated location and the respective modified reference landmark location is substantially the same for two successive iterations, i.e. there is convergence. That is, a location on the printed feature, spacing and/or position is annotated when successive iterations converge to the respective modified reference landmark location.

In order to determine whether or not the document is fraudulent, a geometric score is calculated for each landmark location on the annotated printed feature, spacing and/or position in the digital image of the document based on the distances between the landmark locations on the printed feature, spacing and/or location and the respective original reference landmark locations. A first threshold is defined for each geometric score, above which the respective printed feature, spacing and/or position is identified as "fake." Thus, if a geometric score is above the associated first threshold, then the document is determined to be fraudulent. In this way, not only are fake features, wrong spacings and mispositions detected, the misorientations of the printed features are also detected since a misorientation leads to annotations on features, spacings and/or positions to be outside the associated thresholds.

In some embodiments, for each printed feature, spacing and/or position in the plurality of printed features, spacings and/or positions in the digital image, the geometric score is determined by determining a distribution of the respective modified landmark locations, computing a distance measure between the landmark location and the distribution, and assigning the geometric score based on the computed distance. In some embodiments, before the digital image of the document is inputted into the machine learning model, the digital image is first provided to a font classifier and the document is rejected if a printed feature font in the digital image is not included in the one or more fonts in the first digital images for which the machine learning model was trained. An example of a font classifier is a convolutional neural network.

In some embodiments, if the document is not rejected by the font classifier, the digital image of the document is provided to an edge detection filter after the font classifier and before it is inputted to the trained machine learning model in order to determine a respective score for the sharpness of each printed feature, spacing and/or position in the digital image. The document is rejected as "blurry" if the sharpness score for a printed feature, spacing or position is below an associated second threshold. In some embodiments, after the document is determined not to be fraudulent, a respective "semantic score" is determined for each printed feature, spacing and/or position in the at least one of plurality of printed features, spacings and positions in the digital image, where the semantic score is a correlation between the printed feature, spacing and/or position, and the respective selected printed feature, spacing and/or position in the first digital images. The document is rejected as "bad quality" if the semantic score is below a third associated threshold.

In some embodiments, the correlation is a cross-correlation measure between the printed feature, spacing and/or position and the respective original printed feature, spacing and/or position, wherein the cross-correlation indicates a similarity between appearance and texture of the printed feature, spacing and/or position and the respective original printed feature, spacing and/or position. In some embodiments, where the printed features are alphanumeric characters, the process of training the machine learning model is done separately for upper-case characters, lower-case characters and numerical characters.

In some embodiments, where the document whose authenticity is being tested comprises a plurality of regions, the above method for detecting fraud in a document may be repeated for the plurality of regions of the document. In this case, the step of generating input data for the document comprises generating input data—"region input data"—corresponding to each region and then combining the region input data to generate the input data corresponding to the document.

Other aspects and advantages of the invention will become apparent from the following detailed description, taken in conjunction with the accompanying drawings, illustrating the principles of the invention by way of example only.

BRIEF DESCRIPTION OF THE DRAWINGS

The advantages of the invention described above, together with further advantages, may be better understood by referring to the following description taken in conjunction with the accompanying drawings. The drawings are not necessarily to scale, emphasis instead generally being placed upon illustrating the principles of the invention.

DETAILED DESCRIPTION

Figure 1A:
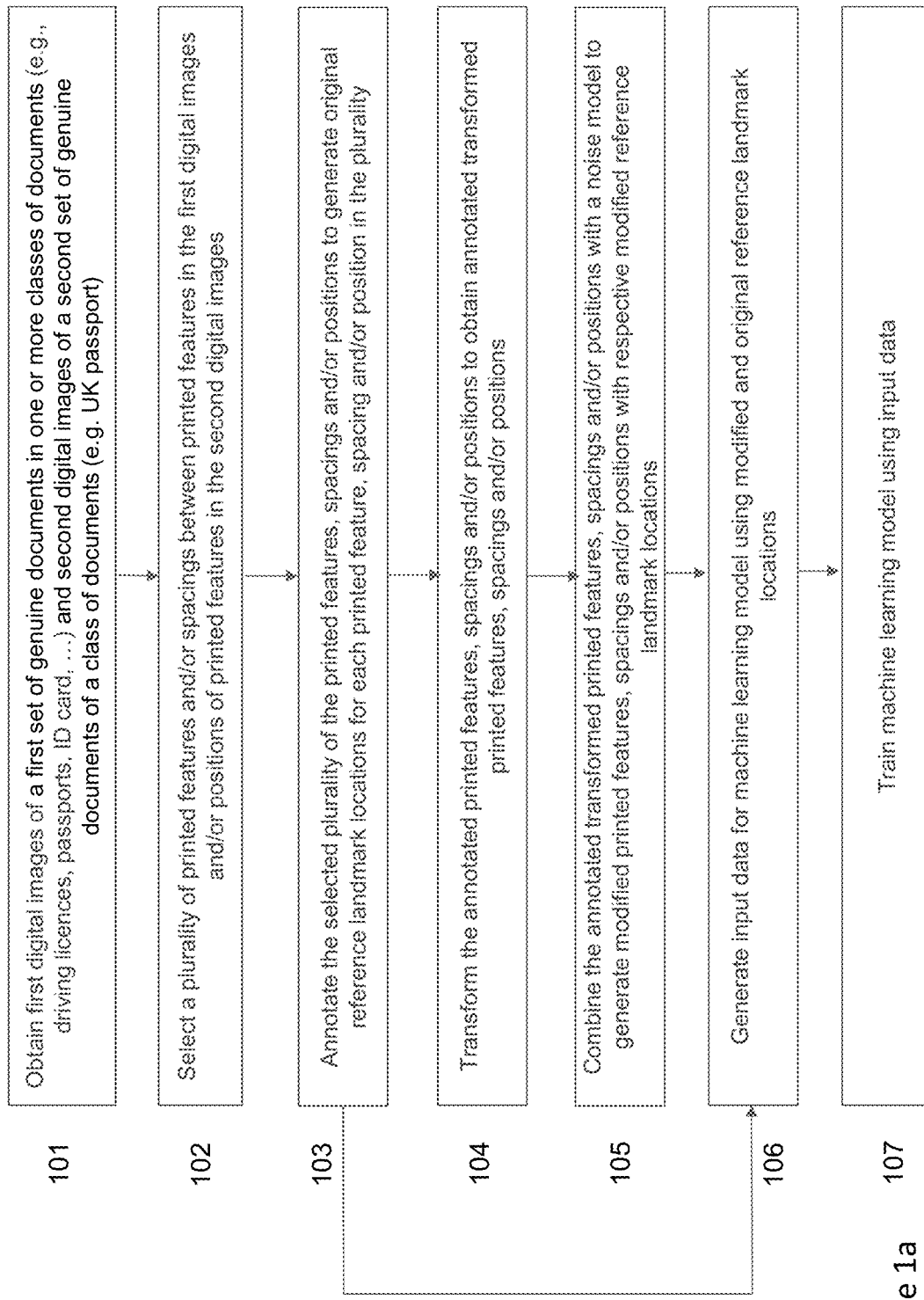
FIG. 1A illustrates an overview of training a machine learning model for detecting fraud in a document.

FIG. 1A schematically depicts a high-level overview of methods of training a machine learning model for detecting fraud in documents in a class of documents. The documents may be government issued documents or otherwise official documents. An official document may take one of many forms such as a driver's license, a passport, a utility or other bill, a birth certificate, a benefits book, a state identity card, or a residency permit. The term "official document" is therefore intended to cover any document that contains structured information that may be used to verify a person's identity or an aspect relating to a person, for example, their address. The different forms of official documents may be referred to herein as being a particular "class" of document, which may be further restricted by the territory of issue. For example, an official document class might be a 'UK passport', a 'Finnish driver's license', etc. With reference to FIG. 1A, training a machine learning model for detecting fraud in a document in a class of documents starts with the step of obtaining digital images of a set of genuine documents in one or more classes of documents—denoted first digital images of the first set of documents—and another set of digital images of a set of genuine documents which belong to the same class of documents as the document which is being authenticated (step 101). For example, if the machine learning model is being trained for detecting fraud in UK passports, then the first set of genuine documents may comprise a set of genuine UK passports, French driver's licenses and California driver's licences, while the second set of genuine documents comprise genuine UK passports only. The first and second sets of genuine documents may comprise one or more documents. Images of the first and second sets of documents are referred to as the first and second digital images, respectively. Each second digital image is an image of a region of the respective document comprising a portion of or the whole respective document. For example, a second digital image may be an image of a name field in the document. The first and second sets of genuine documents may be the same or they may be different. For example, the second set of genuine documents may be a subset of the first set of genuine documents.

Out of these first and second digital images, a number of—for example,—sharp images 10 are selected (step 102). This selection can be done by a human to ensure that only clear and in-focus images are selected. It can also be done automatically by computing a blur score for each first and second digital image to select images with the lowest blur. The blur score may be calculated using a variance of the Laplacian, as described in, for example, R. Bansal et al., "Blur image detection using Laplacian operator and Open-CV," 2016 International Conference System Modeling & Advancement in Research Trends (SMART), Nov. 25-27, 2016, pp. 63-67, available at ieeexplore.ieee.org/document/7894491, which is incorporated herein by reference.

At step 103, printed features and/or spacings between the printed features in the first digital images and/or positions of the printed features in the second digital images are annotated. That is, while the training of the machine learning model by annotating positions of printed features in genuine documents involves annotating positions in genuine documents which belong to the same class as the document that is being authenticated, the training of the machine learning model by annotating printed features and spacings is document agnostic.

This step of annotation can be as one-time human annotation for a particular class of documents. The annotations on the printed features, spacings and positions indicate "original reference landmark locations" as the annotated features, spacings and positions provide references against which instances of the same feature, spacing and position in another document may be compared for fraud detection.

Figure 1B:
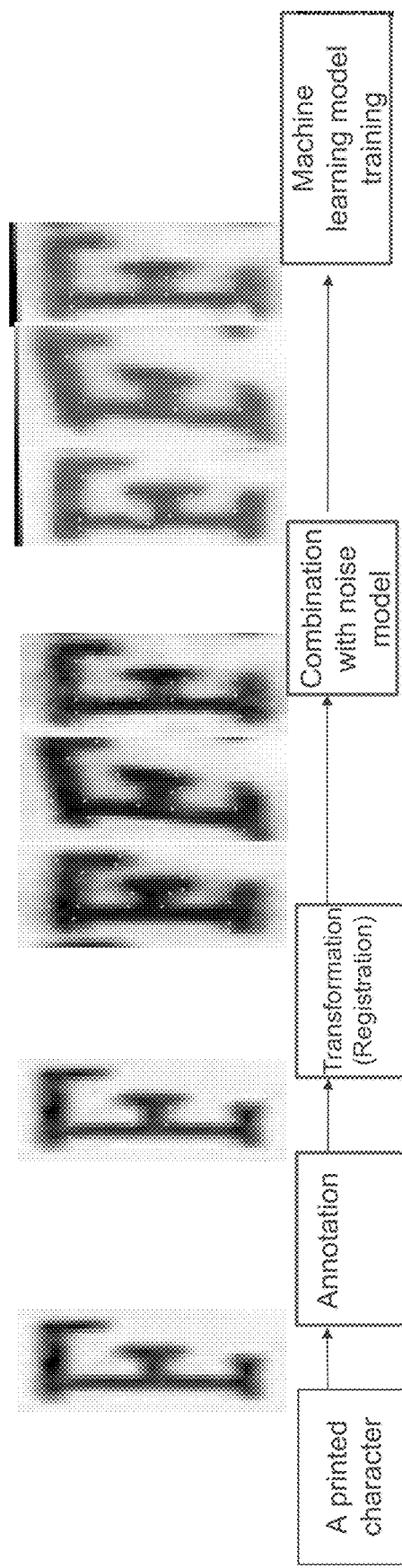
FIG. 1B illustrates an example of generating input for the machine learning model.

Annotating printed features in the first digital images can comprise annotating one or more fonts for each printed feature. Also, uppercase, lowercase and numerical features are annotated separately. For example, uppercase "A" can have twenty-one fonts and eleven annotations on each font. The training of the machine learning model can be done for one or more of these fonts. Annotating a printed feature may comprise annotating a plurality of locations on the printed feature such that a shape of the printed feature can be represented as the annotated plurality of locations. For example, for a printed feature such as a particular font for the letter "A", at least one of edges of the printed feature, a furthest vertical point from a lowest vertical point on the printed feature, a furthest vertical point from a highest vertical point on the printed feature, a furthest horizontal point from a leftmost point on the printed feature, and a furthest horizontal point from a rightmost point on the printed feature is annotated. On the other hand, for a letter such as the letter "C", the annotations may be along the inner and outer curvatures of the letter such that the letter "C" may be represented by the annotations. An example of an annotated letter "F" is shown in FIG. 1B.

A spacing between printed features may be annotated by annotating a horizontal start of the spacing, a vertical start of the spacing, a horizontal end of the spacing and a vertical end of the spacing. In essence, annotating a spacing comprises annotating the corners of a rectangle that defines the spacing. Alternatively, a spacing between two adjacent printed features may be defined as the distance between the centers of mass of the two printed features, where annotating the spacing may comprise annotating the centers of mass. Similarly, a position of a printed feature may be annotated by annotating a horizontal start of the feature, a vertical start of the feature, a horizontal end of the feature and a vertical end of the feature.

Once the printed features, spacings and/or positions of printed features are annotated and original reference landmark locations are obtained, the method proceeds to step 104, where the annotated printed features, spacings and/or positions are "transformed." This transformation is referred to as registration in the art, which is a process of transforming different printed features, spacings and/or positions into the same coordinate system. Registration is performed on two sets of points between a set of reference points and a set of target points so as to bring them into alignment through homographic transformation. The registration may be based on, for example, the least squares method, a programmatic implementation of which is described at: docs.opencv.org/ master/d9/d0c/
group_calib3d.html#ga4abc2ece9fab9398f2e560d53c8c9780.
In the example provided therein, a findHomography( ) function:

| Mat cv::findHomography | ( | InputArray | srcPoints, |
| | | InputArray | dstPoints, |
| | | int | method = 0, |
| | | OutputArray | mask = noArray( ), |
| | | const int | maxIters = 2000, |
| | ) | const double | confidence = 0.995 | may be implemented to find and return the perspective transformation H between the source and destination planes:

$$s_i \begin{bmatrix} x_i' \\ y_i' \\ 1 \end{bmatrix} \sim H \begin{bmatrix} x_i \\ y_i \\ 1 \end{bmatrix}$$

so that the back-projection error $$\sum_i \left( x_i' - \frac{h_{11}x_i + h_{12}y_i + h_{13}}{h_{31}x_i + h_{32}y_i + h_{33}} \right)^2 + \left( y_i' - \frac{h_{21}x_i + h_{22}y_i + h_{23}}{h_{31}x_i + h_{32}y_i + h_{33}} \right)^2$$

is minimized. If the parameter 'method' is set to the default value 0, the function uses all the point pairs to compute an initial homography estimate with a simple least-squares scheme.

The spatial relationships between the transformed printed features, spacings and/or positions can, for example, be translations, rotations, shears or complex deformations. With reference to FIG. 1B, three examples of transformations of an annotated letter "F" are shown. As can be seen from FIG. 1B, the registration of a single annotated letter "F" can yield multiple transformed letter "F"s with their respective annotations. That is, multiple instances of "genuine" annotated printed features, spacings and/or positions can be generated for each respective annotated printed feature, spacing and/or position using registration. In this way, the machine learning model is provided with a number of "genuine" images even when only a limited number of actual documents are available.

With reference to FIG. 1A, at step 105, the annotated transformed printed features, spacings and/or positions are further "augmented" by combining them with a noise model. Here, combining with a noise model can, for example, be imitating at least one of geometric transformations and radiometric transformations of the respective annotated transformed printed features, annotated transformed spacings and/or annotated transformed positions. In this way, for each transformed printed feature, spacing and/or position, yet more "genuine" printed features, spacings and/or positions are generated. The geometric transformations can, for example, include imitating perspective transformations or image distortions, while radiometric transformations may include imitating reflected or emitted radiation measured by a sensor during image capture, which leads to distortions on a document due to document capturing conditions. As a result, not only is the number of training data increased, the geometric and radiometric transformations can represent noise in genuine documents, which means that the machine learning model is ultimately trained to account for certain types of noise in genuine documents.

Alternatively or additionally, the noise model can be determined based on actual noise in digital images of a third set of genuine documents. This third set of genuine documents can be the same as the first set and/or second sets of genuine documents whose images were annotated or they can be a different set of documents. For example, the first set of genuine documents can be a subset of the third set of genuine documents or they can be a different set altogether.

The third set of genuine documents can also be from a different class of document from the class of documents to which the second set of genuine documents belong. That is, while the second set of genuine documents are UK passports when the machine learning model is being trained for detecting fraud in UK passports, the third set of genuine documents from which the noise model is determined may be other documents such as French driver's licenses, German ID cards and/or UK passports, i.e. the noise model is document agnostic. This is because the noise model in this case models the impact of noise on printed features, spacings and positions irrespective of the document and regardless of what the printed feature, spacing and position is.

The noise can be extrinsic or intrinsic noise. Intrinsic noise is noise that is inherent in a document, while extrinsic noise is noise that is added to images during the acquisition of the third digital images. Noise can also arise as a result of the convolution of the intrinsic noise and the extrinsic noise. Intrinsic noise can, for example, be caused by printing the printed features with optically variable ink or variability in the manufacture and printing of documents.

For example, there may be differences in the manufacturing of different sub-versions of a class of documents, e.g., UK passports, which have been issued in different years. Each of these sub-versions may be different in terms of the layout, security features, holograms, fonts, logos, etc. Extrinsic noise can be due to sensor noise, variable light levels, shadows and angles of lighting, out of focus aberrations, motion blur, flash, glare, optical aberrations across devices, aliasing noise, or angle, perspective, rotation, translation, and occlusions in the image acquisition process. Occlusions may occur when a region or feature in the document is partially or fully obstructed by another object such as a user's finger.

Noise can also arise from the physical condition of the documents such as smudge, physical damage or a use of sleeve or plastic covers in a document. Digital resizing of the images—scaling—can also lead to sampling errors and artefacts which further present a source of noise. It is also possible to determine separate noise models for printed features, spacings and positions.

A noise model for printed features can be determined based on noise in printed features in the third digital images. This may be done by measuring the image quality of a plurality of printed features in each third digital image, where image quality may be blur, resolution, glare, contrast and/or occlusion, to obtain image quality metrics for these printed features. The image quality metrics are then calibrated and a signal to noise ratio is measured for printed features in each third digital image based on the calibrated image quality metrics. The calibration of image quality metrics may be done by obtaining empirical distributions of image quality metrics for every image quality metric and mapping every uncalibrated image quality metric to its corresponding percentile in the corresponding empirical distribution. That is, there are separate empirical distributions for resolution, blur, etc. For example, if the uncalibrated image quality metric being calibrated is resolution, then the uncalibrated resolution is mapped to its corresponding percentile in the empirical distribution of resolutions.

The variance of these signal to noise ratios across the third digital images is thus determined so as to model the signal to noise distribution. In this example, the noise model for the printed features is then the distribution of the signal to noise ratio.

Similarly, a noise model may be determined for the spacings between printing features based on spacings between printed features in the third digital images. This is done by defining a bounding box around each printed feature in a plurality of printed features in each third digital image, then defining one or more bounding boxes around one or more printed features that are adjacent to the particular printed feature, and computing the distances between the bounding box around the particular printed feature and the one or more bounding boxes that are adjacent to the printed feature. The computed distance(s) is/are one or more spacings between the respective printed feature and its adjacent printed features. These spacings are then normalized to obtain calibrated spacing measurements. The normalization may be done by converting the uncalibrated spacing measurement to percentile values and using these percentile values as the calibrated spacing measurements. The variance of these calibrated spacings measurements is calculated for the plurality of printed features in the third digital images and the noise model for spacings is determined based on this variance.

The noise model for the positions of the printed features may be determined based on noise in positions of printed features in the third digital images. To this end, for each printed feature in the plurality of printed features in the third digital images, in one example a bounding box is defined around the printed feature. The coordinates of the bounding box may be mapped to a reference coordinate space to obtain mapped bounding box coordinates for the respective printed feature. A variance of the bounding box coordinates or the mapped bounding box coordinates for the plurality of printed features in the third digital images is then calculated, based on which the noise model for the positions of printed features is determined.

For example, the noise models for printed features, spacings, and positions may be determined by assuming Gaussian distributions of, respectively, the image quality metrics, spacing and position measurements. The means and the variances of the Gaussian distributions may then be determined using, respectively, the image quality metrics, the spacing measurements and the position measurements obtained from the third digital images.

For a noise model that is based on noise in digital images of third digital images and where separate noise models are determined for printed features, spacings and positions, at step 105 in FIG. 1A, the annotated transformed printed features are combined with the noise model for printed features, the annotated transformed spacings are combined with the noise model for spacings and the annotated transformed positions are combined with the noise model for positions. This combination, in effect, artificially modifies the original printed feature/spacing/position, as determined by the respective noise model.

The result of these combinations is plurality of modified printed features, a plurality of modified spacings, and a plurality of modified positions for each respective printed feature and spacing in the first digital images and each respective position in the second digital images. Each modified printed feature, modified spacing and modified position has a plurality of annotations that indicate a plurality of "modified reference landmark locations" for the respective modified printed feature, modified spacing and modified position. With reference to FIG. 1B, examples of these modified printed features and modified reference landmark locations can be seen in the letter "F"s at the output of the step of "combination with noise model".

The modified and original reference landmark locations are then used to generate input for the machine learning model and the machine learning model is trained using the input data. The training of the machine learning model can be a supervised training. An example of supervised training that can be used is described in T. Hastie et al, "The Elements of Statistical Learning: Data Mining, Inference, and Prediction," $2^{nd}$ Ed., Springer Series in Statistics, Springer-Verlag New York 2009, which is incorporated herein by reference.

As can be seen from the above and the example of FIG. 1B, a single instance of a printed feature can be used to generate a plurality of "genuine" instances, which are then used to train the machine learning model.

Figure 2A:
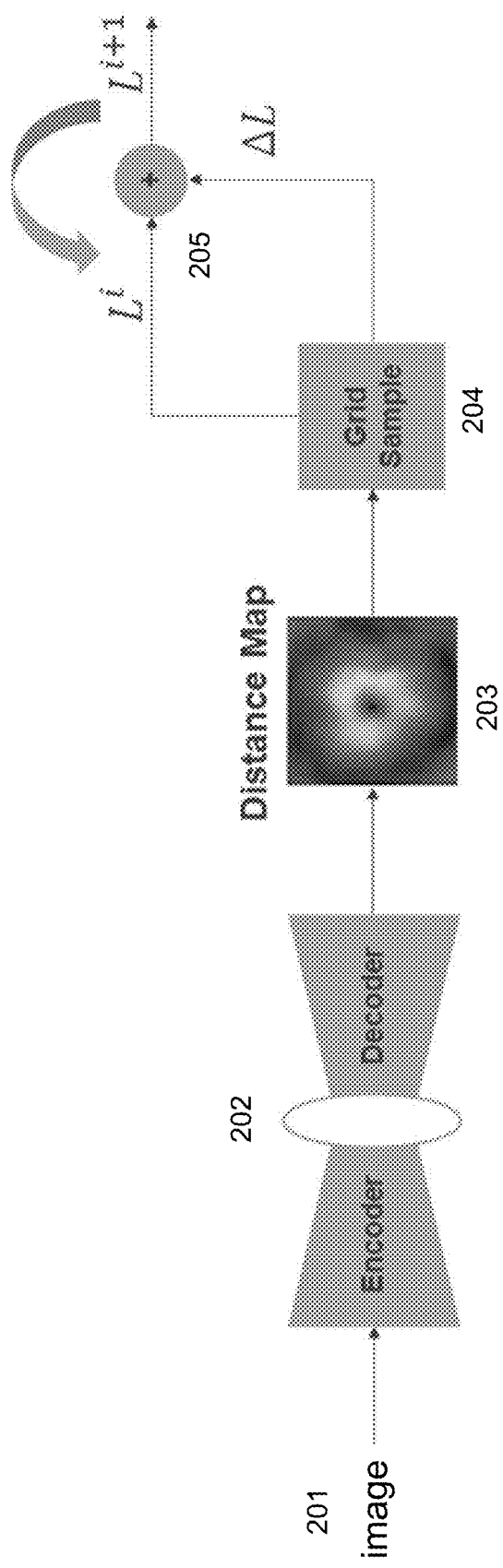
FIG. 2A illustrates an example of a machine learning model.

With reference to FIG. 2A, an example of a machine learning model that may be used in the methods of the present disclosure is depicted. The machine learning model comprises neural network with an encoder and a decoder structure 202 that is tailored for key point detection—an example of which is described in S. Gur et al., "End to end trainable active contours via differentiable rendering", arXiv:1912.00367, Dec. 1, 2019, available at arxiv.org/abs/1912.00367, which is incorporated herein by reference. When an image 201 is inputted to the encoder, the decoder generates a distance map 203 corresponding to the image 201. By training the machine learning model using the modified and original reference landmark locations, the trained machine learning model can generate a distance map corresponding to each printed feature, spacing and/or position for which it has been trained, i.e., printed features, spacings and/or positions for which it has learned the reference landmark locations. Each pixel in a distance map represents the distance to the respective modified reference landmark locations for the respective printed feature, the respective spacing and the respective position. By being able to generate a distance map for every printed feature, spacing and/or position for which the machine learning model has been trained, the trained machine learning model is able to annotate any unlabelled—unannotated—printed feature, spacing and/or position (for which the machine learning model has been trained) that is fed to the trained machine learning model.

The annotation of unlabelled images starts on a grid 204 onto which the input image (of printed feature, spacing, position) has been mapped. The location of an annotation is initialised at a random location on the image on the grid—agnostic to the reference landmark locations—and is iteratively updated according to the distance map for the respective printed feature, spacing or position. At every iteration, the distance between the location of the annotation on the grid and the corresponding reference landmark location is computed. The iterations stops and a location is annotated when the distance that is computed at two successive iterations is substantially the same, i.e. there is convergence. In practice, it was found that the iterations converged after just three iterations. This is shown schematically in feedback loops 205, where $L^i$ is the distance to the reference landmark location for the $i^{th}$ iteration (i being an integer) and $L^{i+1}$ is the distance to the reference landmark location for the $i+1^{th}$ iteration and where $\Delta L$ is the difference between $L^i$ and $L^{i+1}$.

The location where ΔL approaches zero is where the machine learning model annotates the input image 201. This process is repeated for every reference landmark location corresponding to the particular printed feature, spacing or position until all corresponding locations have been annotated on the image 201. In this way, printed features, spacings and/or positions are accurately annotated, which, as will be seen later, makes it possible to detect fraudulent documents based on these annotations.

Figure 2B:
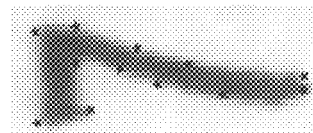
FIG. 2B illustrates examples of distance maps generated by the trained machine learning model and the corresponding outputs.
Figure 2B:
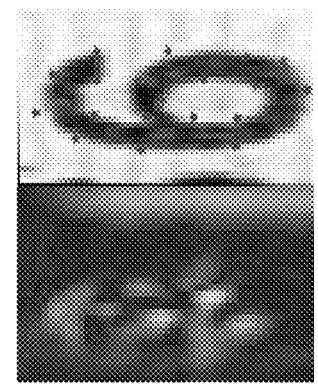
Figure 2B:
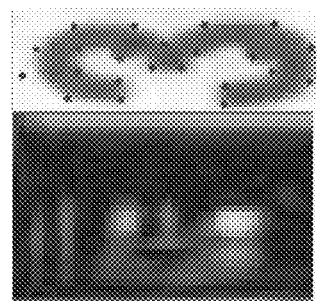

With reference to FIG. 2B, examples of distance maps 2033, 2036 and 2037 are given for numbers 3, 6 and 7, respectively. These numbers have then been annotated using the distance map, where the final locations of the annotations are shown on the numbers with star shaped dots.

Training a machine learning model in this manner to annotate unlabelled images of a document, whose authenticity is not known makes it possible to compare the locations of annotations on images with reference landmark locations and to accurately detect fraud using such comparisons.

The training of a machine learning model has been described in relation to an image of a region of a document, where the region can be the whole document or a portion of it. Where a document comprises a plurality of regions, "region" input data for the machine learning model corresponding to each region is generated and the region input data are combined to generate input data for the machine learning model.

Figure 3:
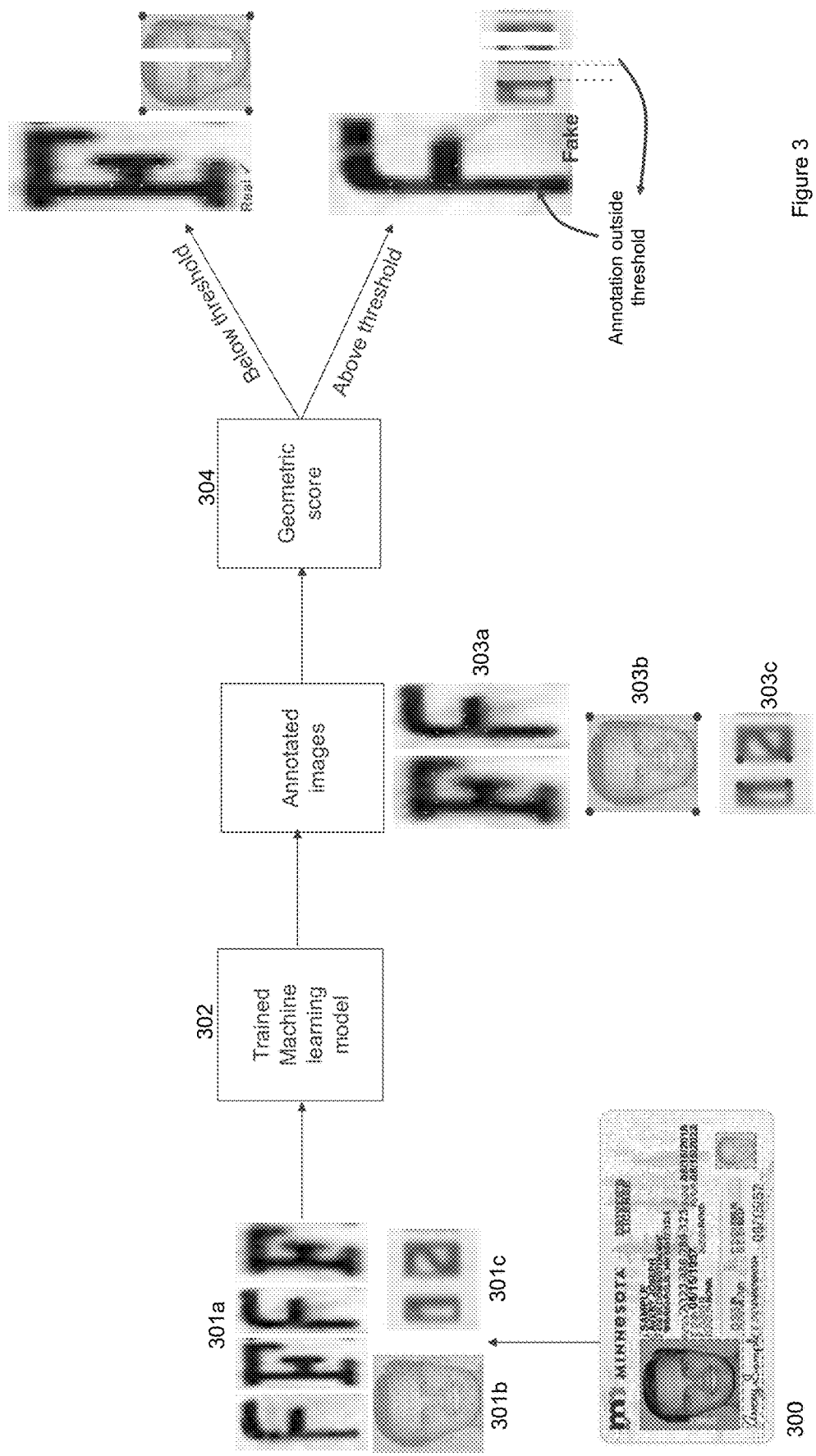
FIG. 3 illustrates an example of how the trained machine learning model is used for detecting fraud in a document.

With reference to FIG. 3, a method for detecting fraud in document 300 using the trained machine learning model is shown. The document presented here is a Minnesota driver's license. The trained machine learning model 302 has been trained in the manner described with reference to FIGS. 1A and 1B. As can be seen in FIG. 3, the image of the driver's license can be split into several "fields" with various printed features whose shapes, positions and spacings may be annotated using the trained machine learning model such that the annotations can be used in fraud detection. As an example, a number of letter "F"s 301a, hologram 301b, and numbers 301c in a field in an image of document 300 are provided to the trained machine learning model 302. The output of the trained machine learning model is annotated images 303a of the letter "F"s—which are annotated in the manner described with reference to FIGS. 2A and 2B to indicate landmark locations on the letters—and also annotated position of the hologram 303b and annotated spacing between two numbers 303c in a document field. To be able to detect fraud based on the annotated "F", annotated position of the hologram and annotated spacing between the numbers, a geometric score is calculated for every landmark location on these annotated letters 303a, hologram 303b and spacing 303c.

The geometric score may be calculated based on the distance between a particular landmark location and its respective original reference landmark location. If a geometric score is above a defined threshold, then the feature is rejected as fake. For example, one of annotations on one of the letters is outside its associated threshold, rendering it fake. Similarly, the distance between spacing annotations for the numbers is outside its associated threshold, which indicates fraud.

Alternatively, the geometric score 304 may be calculated as follows. As was explained earlier with reference to FIGS. 1A and 1B, for each original printed feature or spacing in a first digital image or each position in the second digital image, the machine learning model is trained using a plurality of modified reference landmark locations (plus the original reference landmark locations) that correspond to that particular printed feature, spacing or position. That is, for every annotation or landmark location on a printed feature, spacing or position, there are a number of modified reference landmark locations. That is, for every landmark location on annotated images 303s, 303b and 30c, there is a distribution of reference landmark locations which includes the modified reference landmark locations plus the original reference landmark location corresponding to that particular landmark location.

The geometric score for a landmark location on a printed feature, spacing or position is based on a distance measure between that landmark location and the respective distribution of modified landmark locations. A non-limiting example of the computation of the distance measure is set out below.

In order to compute the distance measure for a landmark location, say, on a printed feature, the coordinates of the landmark location are first transformed to the coordinate system of its corresponding modified reference landmark locations. The mean and covariance of the corresponding modified and original reference landmark locations are then calculated. The covariance matrix, S, of reference landmark locations is a 2×2 matrix since the reference landmark locations are in the x and y coordinates.

The mean, $\vec{\mu}$, of the reference landmark locations may be expressed as:

$$\vec{\mu} = (\mu_1, \mu_2, \ldots, \mu_N)^T$$

where $\mu_N$ represents the mean location of reference landmark locations for the Nth location.

The next step is to calculate a distance of a location vector $$\vec{x} = (x_1, x_2, \ldots, x_N)^T$$

from the reference landmark location distribution. This distance, referred to as the Mahalanobis distance, is calculated as follows:

$$D_M(\vec{x}) = \sqrt{(\vec{x} - \vec{\mu})^T S^{-1} (\vec{x} - \vec{\mu})}$$

Figure 4A:
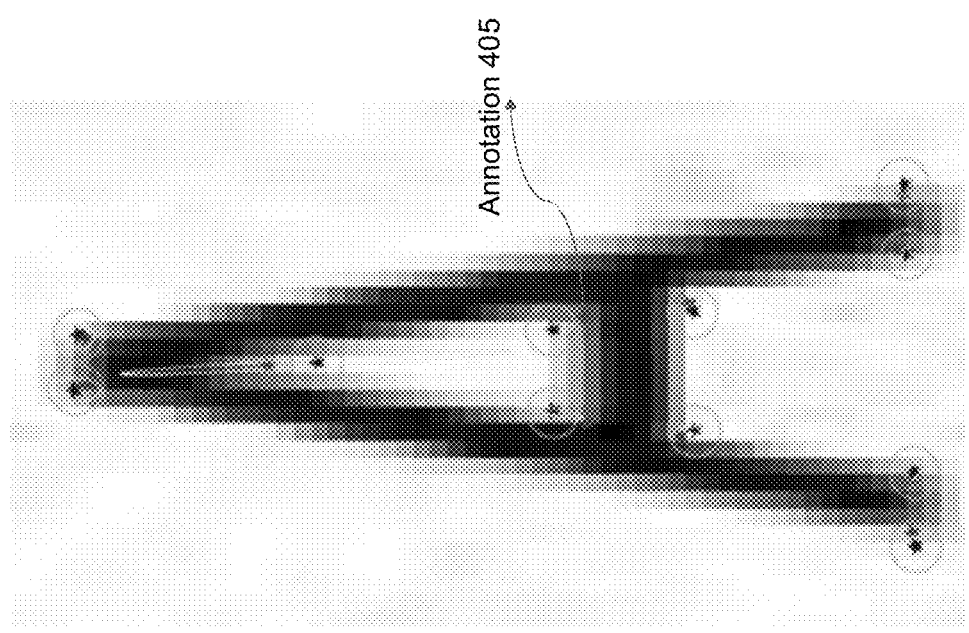
FIG. 4A illustrates examples of how landmarks on an image are used to detect fraud in a document.

FIG. 4A shows two examples 400a and 400b of an annotated letter "A". In example 400a, distributions 401 of reference landmark locations for each landmark location on letter A are shown. The original reference landmark locations 402 for every landmark location is also depicted. Thresholds 403, which appear as circles around the original reference landmark locations and distributions are also presented. As can be seen in 400a, all annotations 404 on the letter are within the defined thresholds for each annotation and so 400a is accepted as "real". On the other hand, in example 400b, annotation 405 is outside its associated threshold and is thus rejected as "fake".

The thresholds for the geometric scores can, for example, be set at a value that rejects a low percentage of the genuine documents as fake, e.g. less than 10%, for example, 3%, 5% or 7%. This percentage may be pre-determined based on an acceptable rate of false rejections of genuine documents. This means that an image is rejected as fake if its geometric score goes above this threshold.

Figure 4A:
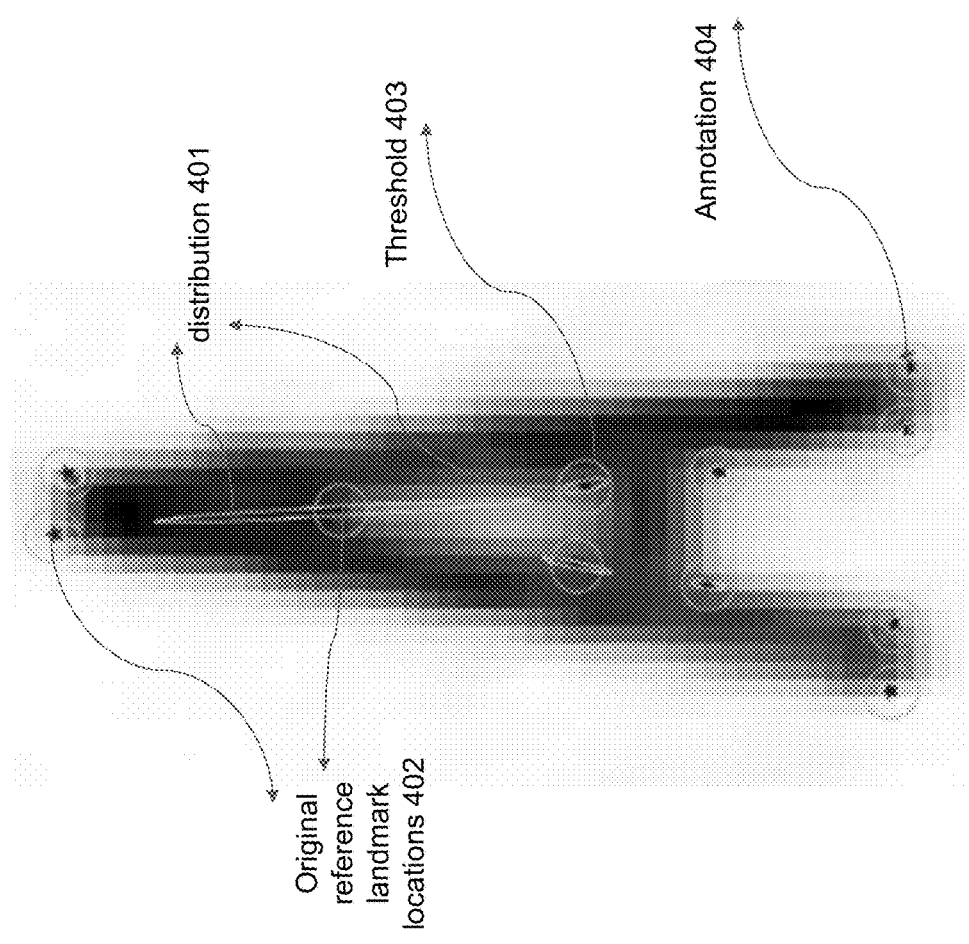
Figure 4B:
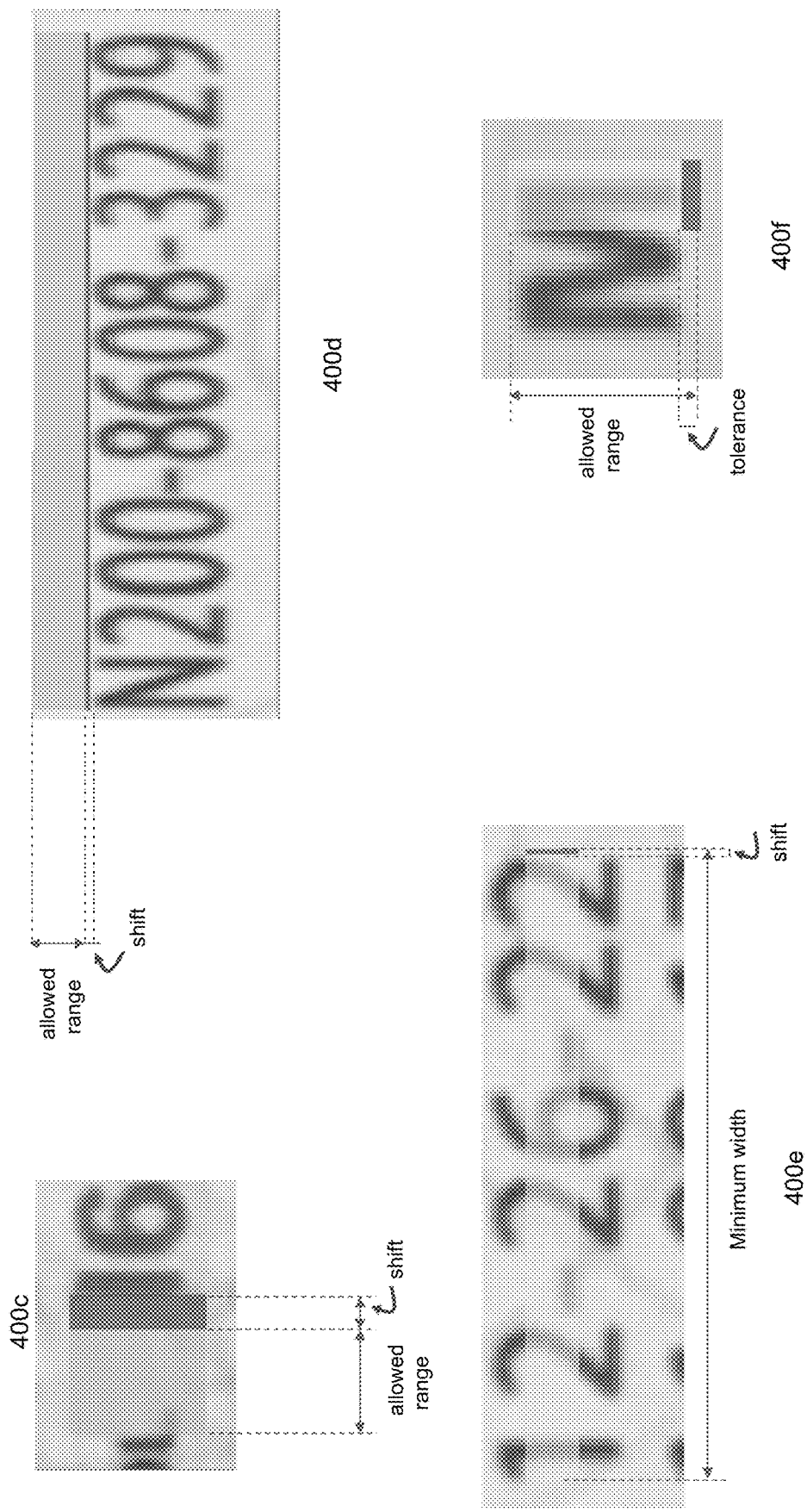
FIG. 4B illustrates examples of how landmarks spacing and positions of fields in a document are used to detect fraud in the document.

FIG. 4B depicts examples of how positions and spacings of printed features may be used to detect fraud. In example 400c, the position of a particular field in a document starts with number "1". The area denoted as the "allowed range" indicates a range of horizontal starting positions within which the document may be considered to be genuine. However, in this particular example, the horizontal start is shifted to the right with respect to the allowed range, which indicates that the document is fraudulent. Looking back to FIG. 3, example 303c, the spacing between the numbers is above the allowed threshold, rendering the document as fake.

Example 400d is an example of measuring the position of a field on a passport. The acceptable vertical start of the field is denoted the "allowed range". The "shift" distance shows that the position of the field is shifted with respect to the allowed range, indicating that the document is fraudulent.

Example 400e shows the expiry date on a passport. The width of the field of expiry date is shorter than the acceptable range by the amount indicated as "shift". This indicates that the document is fraudulent.

Example 400f shows the position of a field as indicated by the field's height. A height that is within the "allowed range" would indicate that the document is genuine. Here, the "tolerance" amount indicates the tolerance within which the height may still be considered to represent the height of the field in a genuine document.

Using the method of the present disclosure as described above, not only are fake features, wrong spacings and mispositions detected, the misorientations of the printed features are also detected since a misorientation leads to annotations on features, spacings and/or positions to be outside the associated thresholds.

Figure 5:
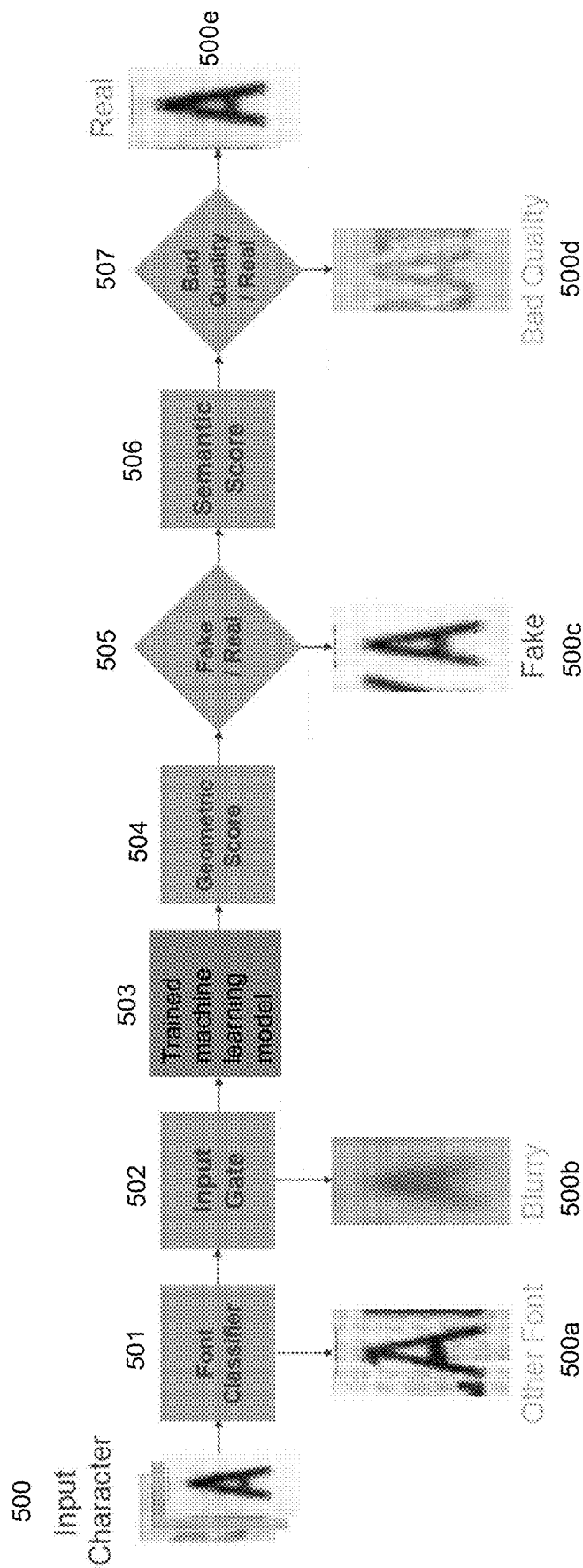
FIG. 5 illustrates an example of how the trained machine learning model is used for detecting fraud in a document.

With reference to FIG. 5, another method for detecting fraud in a document using the trained machine learning model is presented. Here, before an input character 500 is presented to the trained machine learning model 503, it is first passed through a font classifier 501 to check if the machine learning model has been trained for the particular font. The font classifier may be a convolutional neural network such as one that is described in Z. Wang et al., "DeepFont: Identify Your Font from An Image," MM '15: Proceedings of the 23$^{rd}$ ACM International Conference on Multimedia, October 2015, pp. 451-459, available at arxiv.org/pdf/1507.03196.pdf, which is incorporated herein by reference. If an input feature 500 is not a font for which the machine learning model has been trained, it is rejected as the "other font" 500a. In such a case, the machine learning model may be retrained for the unknown font. If, however, the trained machine learning model has been trained for the particular font of the input character 500, then the process proceeds to an input gate 502. An advantage of using a font classifier 501 is that the trained machine learning model is only used for characters and fonts for which it has been trained and thus optimizes the use of the trained machine learning model while improving the accuracy of fraud detection because only those fonts for which the model is trained for are annotated by the trained machine learning model.

The purpose of an input gate 502 is to measure the sharpness of the input character 500 so that blurry images of characters 500b are not inputted to the trained machine learning model 503. An example of an input gate is an edge detector such as a Laplacian filter as described in Bansal (supra), where an image is first passed through a Laplacian filter to detect the edges of the image. The variance of the filtered output is computed as the "sharpness score", where a high variance indicates presence of edge information and hence a sharper image and where a low variance indicates a blurry image with the absence of edge information. In this way, an edge detector may be used to determine a "sharpness score" for the input image 500, such that an image below a defined threshold is rejected as blurry and is thus not inputted to the trained machine learning model 504. An advantage of using an input gate 502 is that by filtering blurry images at the outset, the trained machine learning model is only presented with sharp images and is thus able to annotate the images more accurately, which, in turn, increases the accuracy of fraud detection.

After passing through the input gate 502, the input character 500 is annotated using the trained machine learning model 503 and geometric scores 504 for the annotations on the input character 500 are calculated in the manner described with reference to FIGS. 3 and 4. As discussed with reference to the example of FIG. 4, input character "A" is rejected if a geometric score for an annotation on the character is above a threshold. If, on the other hand, the geometric scores indicate that the input character 500 is real, there can be one last check on the input character in the form of calculating a semantic score 506. The semantic score, in essence, indicates how closely the input image, here, input character 500, is correlated with the corresponding original image using which the machine learning model was trained. For example, input character 500 "A" is compared with the corresponding original "A" (in the first digital images) for which the machine learning model was trained. The correlation between input character 500 and its corresponding original character may be calculated using, for example, the method outlined in docs.opencv.org/master/df/dfb/group_imgproc_object.html#gga3a7850640f1fe1f58fe91a2d7583695 daf9c3ab9296f597ea71f056399a5831da. This is the cross-correlation measure between two images, where a high value indicates that the two images are similar in appearance and texture. Here, the cross-correlation is measured between a printed feature, spacing and/or position and the respective original printed feature, spacing and/or position. The cross-correlation indicates a similarity between appearance and texture of the printed feature, spacing and/or position and the respective original printed feature, spacing and/or position. If the semantic score is below a threshold, say, 0.5, then, the input character 500 is rejected as bad quality. Otherwise, it is indicated to be a real image 500e. An advantage of calculating a semantic score before accepting an image as real is that it provides an extra check to ensure that bad quality images are not erroneously accepted as real, thus improving the accuracy of fraud detection.

Figure 6:
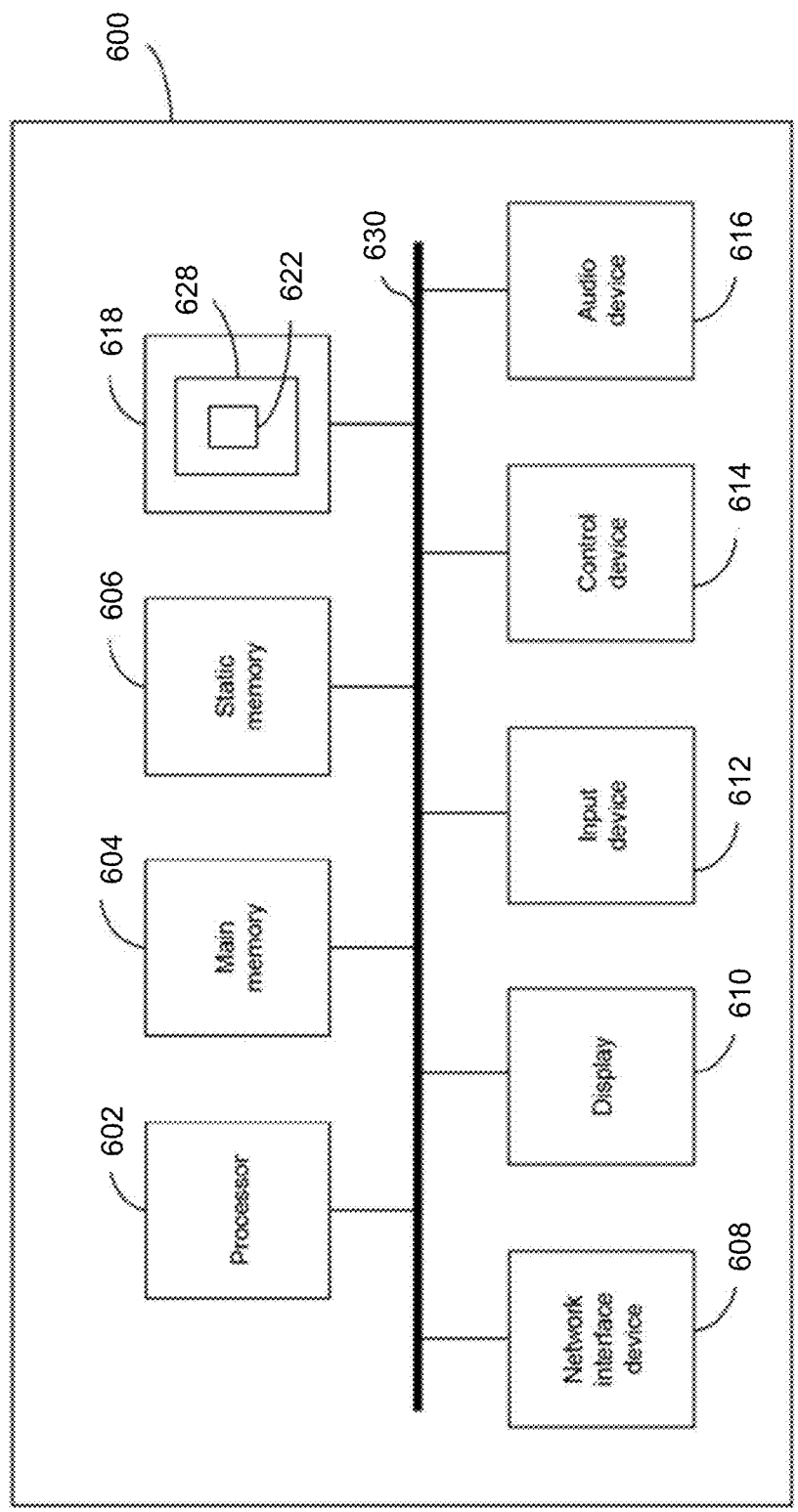
FIG. 6 shows an example implementation of a computing device used to implement the methods of the present disclosure.

FIG. 6 illustrates a block diagram of one implementation of a computing device 600 within which a set of instructions, for causing the computing device to perform any one or more of the methodologies discussed herein, may be executed. In alternative implementations, the computing device may be connected (e.g., networked) to other machines in a Local Area Network (LAN), an intranet, an extranet, or the Internet. The computing device may operate in the capacity of a server or a client machine in a client-server network environment, or as a peer machine in a peer-to-peer (or distributed) network environment. The computing device may be a personal computer (PC), a tablet computer, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single computing device is illustrated, the term "computing device" shall also be taken to include any collection of machines (e.g., computers) that individually or jointly execute a set (or multiple sets) of instructions to perform any one or more of the methodologies discussed herein.

The example computing device 600 includes a processing device 602, a main memory 604 (e.g., read-only memory (ROM), flash memory, dynamic random access memory (DRAM) such as synchronous DRAM (SDRAM) or Rambus DRAM (RDRAM), etc.), a static memory 606 (e.g., flash memory, static random access memory (SRAM), etc.), and a secondary memory (e.g., a data storage device 618), which communicate with each other via a bus 630.

Processing device 602 represents one or more general-purpose processors such as a microprocessor, central processing unit, or the like. More particularly, the processing device 602 may be a complex instruction set computing (CISC) microprocessor, reduced instruction set computing (RISC) microprocessor, very long instruction word (VLIW) microprocessor, processor implementing other instruction sets, or processors implementing a combination of instruction sets. Processing device 602 may also be one or more special-purpose processing devices such as an application specific integrated circuit (ASIC), a field programmable gate array (FPGA), a digital signal processor (DSP), network processor, or the like. Processing device 602 is configured to execute the processing logic (instructions 622) for performing the operations and steps discussed herein.

The computing device 600 may further include a network interface device 608. The computing device 600 also may include a video display unit 610 (e.g., a liquid crystal display (LCD) or a cathode ray tube (CRT)), an alphanumeric input device 612 (e.g., a keyboard or touchscreen), a cursor control device 614 (e.g., a mouse or touchscreen), and an audio device 616 (e.g., a speaker).

The data storage device 618 may include one or more machine-readable storage media (or more specifically one or more non-transitory computer-readable storage media) 628 on which is stored one or more sets of instructions 622 embodying any one or more of the methodologies or functions described herein. The instructions 622 may also reside, completely or at least partially, within the main memory 604 and/or within the processing device 602 during execution thereof by the computer system 600, the main memory 604 and the processing device 602 also constituting computer-readable storage media.

The various methods described above may be implemented by a computer program. The computer program may include computer code arranged to instruct a computer to perform the functions of one or more of the various methods described above. The computer program and/or the code for performing such methods may be provided to an apparatus, such as a computer, on one or more computer readable media or, more generally, a computer program product. The computer readable media may be transitory or non-transitory. The one or more computer readable media could be, for example, an electronic, magnetic, optical, electromagnetic, infrared, or semiconductor system, or a propagation medium for data transmission, for example for downloading the code over the Internet. Alternatively, the one or more computer readable media could take the form of one or more physical computer readable media such as semiconductor or solid state memory, magnetic tape, a removable computer diskette, a random access memory (RAM), a read-only memory (ROM), a rigid magnetic disc, and an optical disk, such as a CD-ROM, CD-R/W or DVD.

In an implementation, the modules, components and other features described herein can be implemented as discrete components or integrated in the functionality of hardware components such as ASICS, FPGAs, DSPs or similar devices.

A "hardware component" is a tangible (e.g., non-transitory) physical component (e.g., a set of one or more processors) capable of performing certain operations and may be configured or arranged in a certain physical manner. A hardware component may include dedicated circuitry or logic that is permanently configured to perform certain operations. A hardware component may be or include a special-purpose processor, such as a field programmable gate array (FPGA) or an ASIC. A hardware component may also include programmable logic or circuitry that is temporarily configured by software to perform certain operations.

Accordingly, the phrase "hardware component" should be understood to encompass a tangible entity that may be physically constructed, permanently configured (e.g., hardwired), or temporarily configured (e.g., programmed) to operate in a certain manner or to perform certain operations described herein.

In addition, the modules and components can be implemented as firmware or functional circuitry within hardware devices. Further, the modules and components can be implemented in any combination of hardware devices and software components, or only in software (e.g., code stored or otherwise embodied in a machine-readable medium or in a transmission medium).

Unless specifically stated otherwise, as apparent from the following discussion, it is appreciated that throughout the description, discussions utilizing terms such as "obtaining", "determining", "comparing", "extracting", "normalising," "generating", "providing", "applying", "training", "feeding", "cropping", "mapping", "selecting", "evaluating", "assigning", "computing", "calculating", or the like, refer to the actions and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

It is to be understood that the above description is intended to be illustrative, and not restrictive. Many other implementations will be apparent to those of skill in the art upon reading and understanding the above description. Although the present disclosure has been described with reference to specific example implementations, it will be recognized that the disclosure is not limited to the implementations described, but can be practiced with modification and alteration within the spirit and scope of the appended claims. Accordingly, the specification and drawings are to be regarded in an illustrative sense rather than a restrictive sense. The scope of the disclosure should, therefore, be determined with reference to the appended claims, along with the full scope of equivalents to which such claims are entitled.

What is claimed is:

1. A computer implemented method for training a machine learning model for detecting fraud in a document of a class of documents, the method comprising:
   (i) obtaining first digital images of a first set of genuine documents in one or more classes of documents and second digital images of a second set of genuine documents of the class of documents, each second digital image being an image of a region of the respective document comprising a portion of or the whole respective document, wherein the second set of genuine documents are the same as, different from, or a subset of the first set of genuine documents;
   (ii) selecting at least one of a plurality of printed features and a plurality of spacings between the plurality of printed features in the first digital images of the first set of genuine documents and a plurality of positions of a plurality of printed features in the second digital images;

(iii) annotating the selected at least one of the plurality of printed features, the plurality of spacings between the plurality of printed features and the plurality of positions of the plurality of printed features to obtain a plurality of original reference landmark locations for each printed feature, spacing and position in the at least one of the plurality of printed features, spacings and positions;

(iv) transforming the annotated at least one of the plurality of printed features, the plurality of spacings between the plurality of printed features and the plurality of positions of the plurality of printed features against a plurality of other instances of the respective annotated printed feature, annotated spacing and/or annotated position to obtain at least one of a plurality of annotated transformed printed features, a plurality of annotated transformed spacings and/or a plurality of annotated transformed positions;

(v) combining the at least one of the plurality of annotated transformed printed features, the plurality of annotated transformed spacings and the plurality of annotated transformed positions with a noise model to generate at least one of a plurality of modified printed features, a plurality of modified spacings and a plurality of modified positions for each respective printed feature, spacing and position in the first digital images, wherein each modified printed feature, modified spacing and modified position comprises a plurality of annotations that indicate a plurality of modified reference landmark locations for the respective modified printed feature, modified spacing and modified position;

(vi) generating input data for the machine learning model using the plurality of original reference landmark locations and the plurality of modified reference landmark locations;

(vii) training the machine learning model using the input data.

2. The method of claim 1, wherein the machine learning model is a neural network model adapted for key point detection.

3. The method of claim 1, wherein the plurality of printed features in the first and second digital images are at least one of alphanumeric characters, holograms, flags, watermarks, or address fields in the first and second sets of genuine documents.

4. The method of claim 3, wherein annotating the at least one of alphanumeric characters in the first digital images of the first set of genuine documents comprises annotating one or more character fonts for each printed character in the at least one of alphanumeric characters.

5. The method of claim 4, wherein the at least one of alphanumeric characters are at least one of upper-case characters, lower-case characters, and numerical characters.

6. The method of claim 1, wherein annotating a plurality of spacings between the printed features in the first digital images comprises either:

for each spacing between two adjacent printed features in the plurality of printed features,
   annotating a horizontal start of the spacing;
   annotating a vertical start of the spacing;
   annotating a horizontal end of the spacing; and
   annotating a vertical end of the spacing, or for each spacing between two adjacent printed features in the plurality of printed features,
   annotating centers of mass of the two adjacent printed features.

7. The method of claim 6, wherein annotating a plurality of positions of the plurality of printed features in the second digital images comprises:

for each printed feature in the plurality of printed features,
   annotating a horizontal start of the printed feature;
   annotating a vertical start of the printed feature;
   annotating a horizontal end of the printed feature; and
   annotating a vertical end of the printed feature.

8. The method of claim 1, wherein combining the at least one of the plurality of annotated transformed printed features, the plurality of annotated transformed spacings, and the plurality of annotated transformed positions with a noise model comprises:

imitating at least one of geometric transformations and radiometric transformations of the respective at least one of the plurality of annotated transformed printed features, the plurality of annotated transformed spacings and the plurality of annotated transformed positions.

9. The method of claim 8, wherein imitating geometric transformations comprises imitating perspective transformations or image distortions, and imitating radiometric transformations comprises imitating reflected or emitted radiation measured by a sensor during image capture.

10. The method of claim 1, wherein the noise model is determined based on noise in third digital images of a third set of genuine documents in the one or more class of documents.

11. The method of claim 10, wherein the first set of documents is the same as or different from a subset of the third set of documents.

12. The method of claim 11, wherein determining the noise model based on noise in the third digital images comprises:

determining a noise model for printed features based on noise in a plurality of printed features in the third digital images, a noise model for spacings between printed features based on noise in a plurality of spacings between the plurality of printed features in the third digital images, and a noise model for positions of printed features based on noise in a plurality of positions of the plurality of printed features in the third digital images; and step (v) comprises combining the noise model for printed features with the plurality of annotated transformed printed features, combining the noise model for spacings with the plurality of annotated transformed spacings, and combining the noise model for positions with the plurality of annotated transformed positions to generate at least one of a plurality of modified printed features, a plurality of modified spacings and a plurality of modified positions for each respective printed feature, spacing, and position in the first digital images, wherein each modified printed feature, modified spacing and modified position comprises a plurality of annotations that indicate a plurality of modified reference landmark locations for the respective modified printed feature, modified spacing and modified position.

13. The method of claim 12, wherein determining the noise model for printed features based on noise in a plurality of printed features in the third digital images comprises:

measuring image quality of the plurality of printed features in each third digital image, wherein the image quality is at least one of blur, resolution, glare, occlusion or contrast, to obtain image quality metrics for the plurality of printed features in the third digital image;
calibrating the image quality metrics;
determining a signal to noise ratio for the plurality of printed features in each third digital image based on the calibrated image quality metrics;
determining a variance of the signal to noise ratio in the third digital images; and
determining the noise model for printed features based on the variance of the signal to noise ratio.

14. The method of claim 12, wherein determining the noise model for spacings between printed features based on noise in a plurality of spacings between the plurality of printed features in the third digital images comprises:
for each printed feature in the plurality of printed features in the third digital images:
defining a bounding box around the printed feature;
defining one or more bounding boxes around one or more printed features adjacent to the printed feature;
computing one or more distances between the bounding box and the one or more bounding boxes to obtain one or more spacings between the respective printed feature and the one or more printed features adjacent to the printed feature; and
normalizing the one or more spacings to obtain one or more calibrated spacing measurements;
determining a variance of the one or more calibrated spacing measurements for the plurality of printed features in the third digital images; and
determining the noise model for spacings between printed features based on the variance of the one or more calibrated spacing measurements.

15. The method of claim 12, wherein determining the noise model for positions of printed features based on noise in a plurality of positions of the plurality of printed features in the third digital images comprises:
for each printed feature in the plurality of printed features in each third digital image:
defining a bounding box around the respective printed feature; and
determining a variance of the bounding box coordinates for the plurality of printed features in the third digital images; and
determining the noise model for positions of printed features based on the variance of the bounding box coordinates.

16. The method of claim 15, the method further comprising mapping the bounding box coordinates to a reference coordinate space to obtain a mapped bounding box coordinates for the respective printed feature and the steps of determining a variance and noise model are performed based on the mapped bounding box coordinates.

17. The method of claim 12, wherein the noise is at least one of intrinsic noise in the third digital images of the third set of genuine documents, extrinsic noise in an acquisition of the third digital images, a convolution of the intrinsic noise and the extrinsic noise, a physical condition of the third set of genuine documents, or scalability.

18. The method of claim 17, wherein the intrinsic noise is caused by printing at least one of the plurality of printed features in the third digital images with optically variable ink or by variability in manufacture and printing of documents.

19. The method of claim 18, wherein the extrinsic noise is at least one of sensor noise, variable light levels, shadows and angles of lighting, out of focus aberrations, motion blur, flash, glare, optical aberrations across devices, aliasing noise, angle, perspective, rotation, translation, or occlusions; and
the physical condition is at least one of smudge, physical damage, or a use of sleeve or a plastic cover in at least one document in the third set of documents.

20. The method of claim 19, wherein scalability is a scaling of fonts in the third digital images.

21. The method of claim 1, further comprising:
(i) providing a digital image of the region of the document;
(ii) providing the trained machine learning model;
(iii) generating input data corresponding to the document for the trained machine learning model using at least one of a plurality of printed features, a plurality of spacings between the plurality of printed features and a plurality of positions of the plurality of printed features in the digital image;
(iv) obtaining, at the output of the trained machine learning model, a plurality of annotations on the at least one of the plurality of printed features, the plurality of spacings between the plurality of printed features, and the plurality of positions of the plurality of printed characters in the digital image of the document to indicate respective landmark locations on the respective annotated printed feature, spacing and/or position on the digital image;
(v) determining a geometric score for each landmark location on the annotated printed feature, annotated spacing and annotated position based on a difference between the landmark locations on the printed feature, spacing and/or position, and the respective modified and original reference landmark locations;
(vi) defining a first threshold for each geometric score above which the respective printed features, spacing or position is identified as fake; and
(vii) determining that the document is fraudulent if the geometric score is above the associated first threshold.

22. The method of claim 21, wherein obtaining, at the output of the trained machine learning model, a plurality of annotations at step (iv) comprises:
generating a respective distance map for each printed feature, spacing and/or position in the at least one of the plurality of printed features, the plurality of spacings between the plurality of printed features, and the plurality of positions of the plurality of printed features in the digital image of the document,
wherein each pixel in each respective distance map represents a distance to the respective modified reference landmark locations for the respective printed feature, the respective spacing and the respective position;
starting, respectively, from a random location in the printed feature spacing and/or position;
iteratively updating a location of the random location according to the respective distance map for the respective printed feature, the respective spacing, and/or the respective position to obtain an updated location;
at every iteration, measuring a distance from the updated location to the respective modified reference landmark location for the respective modified printed feature, the respective modified spacing and/or the respective modified position; and
annotating the printed feature, spacing and/or position in the digital image at the updated location when the distance from the updated location and
the respective modified reference landmark location is substantially the same for two successive iterations.

23. The method of claim 21, wherein determining the geometric score comprises:
- for each landmark location on each printed feature, spacing, and/or position in the at least one of the plurality of printed features, the plurality of spacings, and the plurality of positions in the digital image, determining a distribution of the respective modified reference landmark locations;
- computing a distance measure between the landmark location and the distribution; and
- assigning the geometric score based on the computed distance measure.

24. The method of claim 23, wherein determining the geometric score comprises, for each landmark location on each printed feature, spacing, and/or position in the at least one of the plurality of printed features, the plurality of spacings and the plurality of positions in the digital image, determining another distance measure between the respective landmark location and its respective original reference landmark location and assigning the geometric score based on the other distance measure.

25. The method of claim 21, further comprising:
- providing the digital image of the document to a font classifier before generating input data corresponding to the document for the trained machine learning model; and
- rejecting the document if a printed character font in the digital image is not in the one or more fonts.

26. The method of claim 25, wherein, when the document is not rejected, the method further comprises:
- providing the digital image of the document to an edge detection filter after the font classifier to determine a respective sharpness score for sharpness of each printed character, spacing and/or position in the at least one of the plurality of printed characters, spacings and positions in the digital image; and
- rejecting the document as blurry if the sharpness score for a printed character, spacing or position is below an associated second threshold.

27. The method of claim 21, wherein when the document is determined to not be fraudulent, the method further comprises:
- determining a respective semantic score for each printed feature, spacing and/or position in the at least one of the plurality of printed features, spacings and positions in the digital image,
- wherein the semantic score is a correlation between the printed feature, spacing and position with the respective original printed feature, spacing and/or position.

28. The method of claim 27, wherein the correlation is a cross-correlation measure between the printed feature, spacing and/or position and the respective original printed feature, spacing and/or position, and wherein the cross-correlation indicates a similarity between appearance and texture of the printed feature, spacing and/or position and the respective original printed feature, spacing and/or position; and rejecting the document as bad quality if the semantic score is below a third threshold.

29. The method of claim 21, wherein the document comprises a plurality of regions and wherein the method comprises repeating steps (i)—(vii) for each of the plurality of regions and wherein step (vi) further comprises generating region input data corresponding to each region in the plurality of regions and combining the region input data to generate the input data.

* * * * *